(12) United States Patent
Deshpande et al.

(10) Patent No.: US 12,353,333 B2
(45) Date of Patent: Jul. 8, 2025

(54) PRE-FETCHING ADDRESS TRANSLATION FOR COMPUTATION OFFLOADING

(71) Applicant: Samsung Electronics Co., Ltd., Suwon-si (KR)

(72) Inventors: Aditya Madhusudan Deshpande, Sunnyvale, CA (US); Douglas Joseph, Leander, TX (US); Manisha Gajbe, Folsom, CA (US); Arun Rodrigues, Albuquerque, NM (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/587,940

(22) Filed: Feb. 26, 2024

(65) Prior Publication Data

US 2025/0117337 A1  Apr. 10, 2025

Related U.S. Application Data

(60) Provisional application No. 63/543,511, filed on Oct. 10, 2023.

(51) Int. Cl.
  *G06F 12/10*  (2016.01)
  *G06F 12/1027*  (2016.01)

(52) U.S. Cl.
  CPC .... *G06F 12/1027* (2013.01); *G06F 2212/306* (2013.01)

(58) Field of Classification Search
  CPC .......... G06F 12/1027; G06F 2212/306; G06F 2212/1008; G06F 2212/1016; G06F 2212/1032; G06F 3/06
  See application file for complete search history.

(56) References Cited

U.S. PATENT DOCUMENTS

| | | | |
|---|---|---|---|
| 8,990,527 B1* | 3/2015 | Linstead | G06F 3/067 711/170 |
| 11,604,594 B2 | 3/2023 | Narayanan et al. | |
| 11,704,253 B2 | 7/2023 | Speier et al. | |
| 2014/0101405 A1* | 4/2014 | Papadopoulou | G06F 12/1027 711/207 |
| 2020/0042347 A1* | 2/2020 | Prosch | G06F 9/48 |
| 2021/0026774 A1* | 1/2021 | Lim | G06F 9/30189 |
| 2021/0149815 A1 | 5/2021 | Gayen et al. | |
| 2022/0011941 A1 | 1/2022 | Alverti et al. | |

(Continued)

FOREIGN PATENT DOCUMENTS

| | | |
|---|---|---|
| CN | 113064697 A | 7/2021 |
| EP | 4147427 A1 | 3/2023 |

*Primary Examiner* — Khoa D Doan
(74) *Attorney, Agent, or Firm* — Renaissance IP Law Group LLP

(57) ABSTRACT

Provided are systems, methods, and apparatuses for transferring computational tasks. In one or more examples, the systems, methods, and apparatuses include a first host configured to detect a trigger to offload instruction code from the first host to a second host; identify, based on the trigger, an address translation binding for the instruction code and an address translation binding for application data associated with the instruction code; copy the address translation binding for the instruction code and the address translation binding for the application data to a memory; and transfer control of execution of the instruction code to the second host based on the copying.

20 Claims, 9 Drawing Sheets

(56) References Cited

U.S. PATENT DOCUMENTS

| | | |
|---|---|---|
| 2022/0066946 A1 | 3/2022 | Kotra et al. |
| 2022/0188165 A1* | 6/2022 | O'Hare ................... H04L 67/34 |
| 2024/0134696 A1* | 4/2024 | Moshe ................... G06F 9/5027 |

* cited by examiner

PRE-FETCHING ADDRESS TRANSLATION FOR COMPUTATION OFFLOADING

CROSS-REFERENCE TO RELATED APPLICATIONS

This application claims the benefit of U.S. Provisional Patent Application Ser. No. 63/543,511, filed Oct. 10, 2023, which is incorporated by reference herein for all purposes.

TECHNICAL FIELD

The disclosure relates generally to memory systems, and more particularly to pre-fetching address translation for computation offloading.

BACKGROUND

The present background section is intended to provide context only, and the disclosure of any concept in this section does not constitute an admission that said concept is prior art.

The following relates to computation offloading. Computation offloading is the process of moving resource-intensive computational tasks from a first processing unit to a second processing unit on the same device or another device. Computation offloading can improve the performance of applications and increase the capabilities of underlying systems. Computation offloading can be used to improve quality of service (QOS), reduce serving delay, and/or reduce energy consumption. Computation offloading can be used for reinforcement learning, mobile devices, cloudlets, resource allocation, edge servers, energy consumption, unmanned aerial vehicles, multi-access edge computing, etc.

The above information disclosed in this Background section is only for enhancement of understanding of the background of the disclosure and therefore it may contain information that does not constitute prior art.

SUMMARY

In various embodiments, the techniques described herein include systems, methods, and apparatuses for pre-fetching address translation for computation offloading. In some aspects, the techniques described herein relate to a method for transferring computational tasks, the method including: detecting a trigger to offload instruction code from a first host to a second host; identifying, based on the trigger, an address translation binding for the instruction code and an address translation binding for application data associated with the instruction code; copying the address translation binding for the instruction code and the address translation binding for the application data to a memory; and transferring control of execution of the instruction code to the second host based on the copying.

In some aspects, the techniques described herein relate to a method, wherein the memory includes: a first buffer configured to hold instruction code address translations; and a second buffer configured to hold application data address translations.

In some aspects, the techniques described herein relate to a method, further including: configuring a size of the first buffer based on a size of a first translation lookaside buffer (TLB) of the second host that is configured for storing instruction code segments; and configuring a size of the second buffer based on a size of a second TLB of the second host that is configured for storing data code segments.

In some aspects, the techniques described herein relate to a method, wherein transferring control of execution of the instruction code includes issuing an instruction to the second host to copy the address translation binding for the instruction code from the first buffer to the first TLB and copy the address translation binding for the application data from the second buffer to the second TLB.

In some aspects, the techniques described herein relate to a method, further including providing the address translation binding for the instruction code and the address translation binding for the application data to a third host.

In some aspects, the techniques described herein relate to a method, wherein the memory includes a global address space that is accessible to the first host, the second host, and the third host.

In some aspects, the techniques described herein relate to a method, wherein transferring control of the execution of the instruction code to the second host includes transferring control of the execution of the instruction code to the second host and the third host.

In some aspects, the techniques described herein relate to a method, further including indicating the offloading of the instruction code in an offload work queue that is accessible to the second host and the third host.

In some aspects, the techniques described herein relate to a method, wherein: the first host is an operating system associated with a processing unit of a first device, the second host is a first accelerator of the first device or a second device different from the first device, and the third host is a second accelerator of the first device, the second device, or of a third device different from the first device and the second device.

In some aspects, the techniques described herein relate to a method for assuming computational tasks, the method including: based on an instruction received from a first host, copying: an address translation binding for instruction code from a first location of a memory to an instruction buffer of a second host; and an address translation binding for application data from a second location of the memory to a data buffer of the second host; receiving, at the second host from the first host, control of execution of the instruction code based on the copying; and executing the instruction code based on receiving the control of the execution.

In some aspects, the techniques described herein relate to a method, wherein: the instruction buffer of the second host is a first translation lookaside buffer (TLB) of the second host that is configured for storing instruction code segments, and the data buffer of the second host is a second TLB of the second host that is configured for storing data code segments.

In some aspects, the techniques described herein relate to a method, wherein: the first location of the memory is a first buffer configured to hold instruction code address translations; and the second location of the memory is a second buffer configured to hold application data address translations.

In some aspects, the techniques described herein relate to a method, wherein: a size of the first buffer is based on a size of the instruction buffer of the second host; and a size of the second buffer is based on a size of the data buffer of the second host.

In some aspects, the techniques described herein relate to a method, further including sharing the address translation binding for the instruction code and the address translation binding for the application data with a third host.

In some aspects, the techniques described herein relate to a method, wherein the first buffer and the second buffer of the memory are configured in a global address space that is accessible to the first host, the second host, and the third host.

In some aspects, the techniques described herein relate to a method, further including: identifying an offloading of the instruction code based on an offload work queue that is accessible to the second host and the third host.

In some aspects, the techniques described herein relate to a method, wherein: the address translation binding for the instruction code enables the second host to determine a starting address of the instruction code, and the address translation binding for the application data enables the second host to determine a starting address of the application data.

In some aspects, the techniques described herein relate to a non-transitory computer-readable medium storing code, the code including instructions executable by a processor of a device to: detect a trigger to offload instruction code from a first host to a second host; identify, based on the trigger, an address translation binding for the instruction code and an address translation binding for application data associated with the instruction code; copy the address translation binding for the instruction code and the address translation binding for the application data to a memory; and transfer control of execution of the instruction code to the second host based on the copying.

In some aspects, the techniques described herein relate to a non-transitory computer-readable medium, wherein the memory includes: a first buffer configured to hold instruction code address translations; and a second buffer configured to hold application data address translations.

In some aspects, the techniques described herein relate to a non-transitory computer-readable medium, wherein the code includes further instructions executable by the processor to cause the device to: configure a size of the first buffer based on a size of a first translation lookaside buffer (TLB) of the second host that is configured for storing instruction code segments; and configure a size of the second buffer based on a size of a second TLB of the second host that is configured for storing data code segments.

A computer-readable medium is disclosed. The computer-readable medium can store instructions that, when executed by a computer, cause the computer to perform substantially the same or similar operations as described herein are further disclosed. Similarly, non-transitory computer-readable media, devices, and systems for performing substantially the same or similar operations as described herein are further disclosed.

Accordingly, particular embodiments of the subject matter described herein can be implemented so as to realize one or more of the following advantages: the described techniques include offload logic that includes any combination of logic, circuitry, software, and/or hardware configured to avoid (e.g., minimize) page faults with respect to computation offloading (e.g., application execution transfer). By avoiding page faults, the offload logic minimizes performance penalties and delays associated with the application execution transfer process. The offload logic avoids page faults by providing address translation bindings to an accelerator as part of the application execution transfer process (e.g., offload process). The offload logic writes mapped memory locations with the address translation bindings. In some cases, the offload logic minimizes page faults by enabling two or more accelerators to share a set of the initial address translation bindings. The offload logic minimizes page faults by enabling an accelerator to read address translation bindings from a pre-defined memory location and populate one or more local translation lookaside buffers (TLBs). Accordingly, the offload logic described herein improves the code offload process (e.g., including small code sections) by minimizing page faults associated with the offload process (e.g., at the start of the application offload), thus improving overall system performance.

BRIEF DESCRIPTION OF THE DRAWINGS

The above-mentioned aspects and other aspects of the present techniques will be better understood when the present application is read in view of the following figures in which like numbers indicate similar or identical elements. Further, the drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

Figure 1:
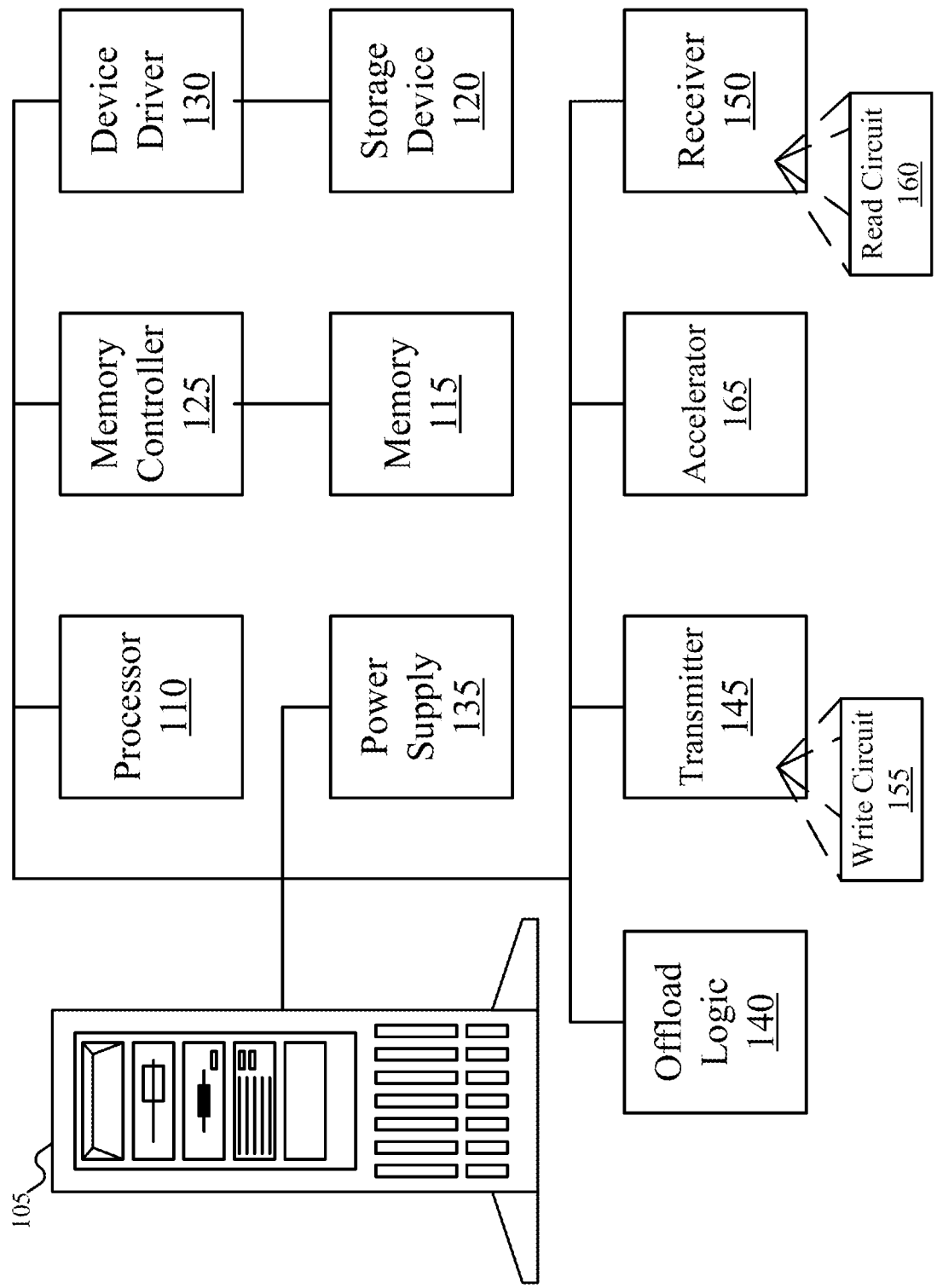
FIG. 1 illustrates an example system in accordance with one or more implementations as described herein.

While the present techniques are susceptible to various modifications and alternative forms, specific embodiments thereof are shown by way of example in the drawings and will herein be described. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

The following description is presented to enable one of ordinary skill in the art to make and use the subject matter disclosed herein and to incorporate it in the context of particular applications. While the following is directed to specific examples, other and further examples may be devised without departing from the basic scope thereof.

Various modifications, as well as a variety of uses in different applications will be readily apparent to those skilled in the art, and the general principles defined herein may be applied to a wide range of embodiments. Thus, the subject matter disclosed herein is not intended to be limited to the embodiments presented, but is to be accorded the widest scope consistent with the principles and novel features disclosed herein.

In the description provided, numerous specific details are set forth in order to provide a more thorough understanding of the subject matter disclosed herein. It will, however, be apparent to one skilled in the art that the subject matter disclosed herein may be practiced without necessarily being limited to these specific details. In other instances, well-known structures and devices are shown in block diagram form, rather than in detail, in order to avoid obscuring the subject matter disclosed herein.

All the features disclosed in this specification, (including, for example, any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Various features are described herein with reference to the figures. It should be noted that the figures are only intended to facilitate the description of the features. The various features described are not intended as an exhaustive description of the subject matter disclosed herein or as a limitation on the scope of the subject matter disclosed herein. Additionally, an illustrated example need not have all the aspects or advantages shown. An aspect or an advantage described in conjunction with a particular example is not necessarily limited to that example and can be practiced in any other examples even if not so illustrated, or if not so explicitly described.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, the labels are used to reflect relative locations and/or directions between various portions of an object.

Any data processing may include data buffering, aligning incoming data from multiple communication lanes, forward error correction ("FEC"), and/or others. For example, data may be first received by an analog front end (AFE), which prepares the incoming for digital processing. The digital portion (e.g., DSPs) of the transceivers may provide skew management, equalization, reflection cancellation, and/or other functions. It is to be appreciated that the process described herein can provide many benefits, including saving both power and cost.

Moreover, the terms "system," "component," "module," "interface," "model," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless explicitly stated otherwise, each numerical value and range may be interpreted as being approximate as if the word "about" or "approximately" preceded the value of the value or range. Signals and corresponding nodes or ports might be referred to by the same name and are interchangeable for purposes here.

While embodiments may have been described with respect to circuit functions, the embodiments of the subject matter disclosed herein are not limited. Possible implementations, may be embodied in a single integrated circuit, a multi-chip module, a single card, system-on-a-chip, or a multi-card circuit pack. As would be apparent to one skilled in the art, the various embodiments might also be implemented as part of a larger system. Such embodiments may be employed in conjunction with, for example, a digital signal processor, microcontroller, field-programmable gate array, application-specific integrated circuit, or general-purpose computer.

As would be apparent to one skilled in the art, various functions of circuit elements may also be implemented as processing blocks in a software program. Such software may be employed in, for example, a digital signal processor, microcontroller, or general-purpose computer. Such software may be embodied in the form of program code embodied in tangible media, such as magnetic recording media, optical recording media, solid-state memory, floppy diskettes, CD-ROMs, hard drives, or any other non-transitory machine-readable storage medium, that when the program code is loaded into and executed by a machine, such as a computer, the machine becomes an apparatus for practicing the subject matter disclosed herein. When implemented on a general-purpose processor, the program code segments combine with the processor to provide a unique device that operates analogously to specific logic circuits. Described embodiments may also be manifest in the form of a bit stream or other sequence of signal values electrically or optically transmitted through a medium, stored magnetic-field variations in a magnetic recording medium, etc., generated using a method and/or an apparatus as described herein.

The following description is presented to enable one of ordinary skill in the art to make and use the subject matter disclosed herein and to incorporate it in the context of particular applications. While the following is directed to specific examples, other and further examples may be devised without departing from the basic scope thereof.

Various modifications, as well as a variety of uses in different applications will be readily apparent to those skilled in the art, and the general principles defined herein may be applied to a wide range of embodiments. Thus, the subject matter disclosed herein is not intended to be limited to the embodiments presented, but is to be accorded the widest scope consistent with the principles and novel features disclosed herein.

In the description provided, numerous specific details are set forth in order to provide a more thorough understanding of the subject matter disclosed herein. It will, however, be apparent to one skilled in the art that the subject matter disclosed herein may be practiced without necessarily being limited to these specific details. In other instances, well-known structures and devices are shown in block diagram form, rather than in detail, in order to avoid obscuring the subject matter disclosed herein.

All the features disclosed herein, (including, for example, any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Various features are described herein with reference to the figures. It should be noted that the figures are only intended to facilitate the description of the features. The various features described are not intended as an exhaustive description of the subject matter disclosed herein or as a limitation on the scope of the subject matter disclosed herein. Additionally, an illustrated example need not have all the aspects or advantages shown. An aspect or an advantage described in conjunction with a particular example is not necessarily limited to that example and can be practiced in any other examples even if not so illustrated, or if not so explicitly described.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

It is noted that, if used, the labels left, right, front, back, top, bottom, forward, reverse, clockwise and counter clockwise have been used for convenience purposes only and are not intended to imply any particular fixed direction. Instead, the labels are used to reflect relative locations and/or directions between various portions of an object.

Any data processing may include data buffering, aligning incoming data from multiple communication lanes, forward error correction ("FEC"), and/or others. For example, data may be first received by an analog front end (AFE), which prepares the incoming for digital processing. The digital portion (e.g., DSPs) of the transceivers may provide skew management, equalization, reflection cancellation, and/or other functions. It is to be appreciated that the process described herein can provide many benefits, including saving both power and cost.

Moreover, the terms "system," "component," "module," "interface," "model," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless explicitly stated otherwise, each numerical value and range may be interpreted as being approximate as if the word "about" or "approximately" preceded the value of the value or range. Signals and corresponding nodes or ports might be referred to by the same name and are interchangeable for purposes here.

While embodiments may have been described with respect to circuit functions, the embodiments of the subject matter disclosed herein are not limited. Possible implementations, may be embodied in a single integrated circuit, a multi-chip module, a single card, system-on-a-chip, or a multi-card circuit pack. As would be apparent to one skilled in the art, the various embodiments might also be implemented as part of a larger system. Such embodiments may be employed in conjunction with, for example, a digital signal processor, microcontroller, field-programmable gate array, application-specific integrated circuit, or general-purpose computer.

As would be apparent to one skilled in the art, various functions of circuit elements may also be implemented as processing blocks in a software program. Such software may be employed in, for example, a digital signal processor, microcontroller, or general-purpose computer. Such software may be embodied in the form of program code embodied in tangible media, such as magnetic recording media, optical recording media, solid-state memory, floppy diskettes, CD-ROMs, hard drives, or any other non-transitory machine-readable storage medium, that when the program code is loaded into and executed by a machine, such as a computer, the machine becomes an apparatus for practicing the subject matter disclosed herein. When implemented on a general-purpose processor, the program code segments combine with the processor to provide a unique device that operates analogously to specific logic circuits. Described embodiments may also be manifest in the form of a bit stream or other sequence of signal values electrically or optically transmitted through a medium, stored magnetic-field variations in a magnetic recording medium, etc., generated using a method and/or an apparatus as described herein.

A page table is the data structure used by a virtual memory system in a computer operating system to store the mapping between virtual addresses and physical addresses. Virtual addresses are used by the program executed by the accessing process, while physical addresses are used by the hardware, such as random-access memory (RAM). The page table is a component of virtual address translation that used to access data in physical memory. The memory management unit (MMU) inside a central processing unit (CPU) stores a cache of recently used mappings from the operating system's page table. This cache may be referred to as a translation lookaside buffer (TLB). The TLB may also be referred to as an address translation cache and/or an associative cache.

When a virtual address is requested to be translated into a physical address, the TLB is searched. If a match is found (e.g., TLB hit), the physical address is returned and the memory access continues. If there is no match (e.g., TLB miss), the MMU or the operating system's TLB miss handler will perform a page walk, or look for the address mapping in the page table to see whether a page of the mapping is found in the page table. If a page for the mapping is found in the page table, the mapping is written to the TLB. The subsequent translation will then result in a TLB hit, and the memory access continues. If a page for the mapping is not found in the page table, then a page fault occurs. In this case, the page is read from storage (e.g., SSD, disk, secondary memory) via the operating system.

Computation offloading is the process of transferring resource-intensive computational tasks from one processor to another processor, accelerator, or external platform (e.g., cluster, grid, cloud). Computation offloading may include transferring a computational task from a node to an edge node, fog node, Cloudlet, base station, or access point.

Hardware acceleration refers to the process by which an application can offload certain computing tasks onto specialized hardware components within a given system, enabling greater efficiency than is possible in software running on a general-purpose processor alone. An accelerator (e.g., hardware accelerator, processor accelerator, co-processor) is a device configured to perform one or more specific tasks more efficiently than a general-purpose processor. This allows the general-purpose processor (e.g., CPU, graphical processing unit (GPU), etc.) to run more efficiently by reducing its computational load. Accelerators can perform operations with greater energy efficiency. Accelerators can be based on a custom logic design. Some chips in mobile, edge, and/or cloud computing use multiple accelerators (e.g., accelerator-level parallelism (ALP)). Thus, accelerators are purpose-built logical circuitry that accompany a processor for accelerating certain functions or workloads.

Accelerators are widely used in high-performance computing. When running an application with multiple compute resources, application execution may start on one computing resource (e.g., a central processing unit) and may then be transferred to another computing resource (e.g., accelerator).

Triggering offload computation can depend on the characteristics of the application being offloaded, resources of the origin device (e.g., CPU), resources of the receiving device (e.g., accelerator), the offloading platform, the network environment, etc. In some cases, computational offloading is triggered by a determination (e.g., by a runtime of an operating system or programming model) that performance of resource-intensive tasks can be executed more efficiently on another computing element such as an accelerator. Some factors that can trigger computational offloading include energy consumption of the task on the origin device, latency of the task on the origin device, a quality of service of the task on the origin device, availability of resources on the origin device, and the like. When the origin device determines that a task consumes a relatively high level of battery power (e.g., exceeds a battery power threshold), the origin device may offload the task to a more energy-efficient platform. When the origin device determines that a task calls for a relatively fast response time (e.g., below a response time threshold), the origin device may offload the task to a platform that can provide lower latency. When the origin device determines that the task demands a relatively high level of quality of service (e.g., exceeds a quality-of-service threshold), the origin device may offload the task to a platform that can offer higher quality of service (e.g., higher accuracy, reliability, or security). When the task competes with other tasks for the limited resources of the origin device (e.g., processing, memory, storage resources), the origin device may offload the task to a platform that has more resources.

The systems, methods, and apparatuses described herein implement offload logic that includes any combination of logic, circuitry, software, and/or hardware configured to avoid (e.g., minimize) page faults at the start of an offload (e.g., application execution transfer). The offload logic provides address translation bindings to an accelerator as part of an offload process (e.g., application transfer process). The offload logic identifies the address translation bindings for the instruction code (e.g., application code, an application's executable code) to be run on the accelerator (e.g., OFFLOAD_BINDINGS_I) and copies the address translation bindings for the instruction code to a first buffer. The offload logic identifies the address translation bindings for the application data to be used in the execution of the instruction code on the accelerator (e.g., OFFLOAD_BINDINGS_D) and copies the address translation bindings for the application data to a second buffer. The techniques described herein enable multiple accelerators to share a set of address translation bindings (e.g., a set of initial address translation bindings). The techniques described herein enable accelerators to read address translation bindings from pre-defined memory locations and populate local TLBs.

Instruction code is a set of bits that tells a computer to perform a task (e.g., what operations to perform). Instruction code may be referred to as instruction set, machine code, machine language. An instruction code is a group of binary codes that represent the operations a computer processor performs. The structure of an instruction code depends on the processor's architecture. In some cases, an instruction code may include an operation field (e.g., operational code, opcode) that indicates an operation to perform, such as addition, subtraction, or multiplication. In some cases, an instruction code may include an address field that specifies the data on which the operation is performed. In some cases, an instruction code may include a mode field that indicates how the memory address of the operand is determined. Computers may have three formats for instruction code: memory reference, register, and input/output. The central processing unit (CPU) follows an instruction cycle to process instructions. The instruction cycle is also known as the fetch-decode-execute cycle, or simply the fetch-execute cycle.

Application data is data used by an application (e.g., data used in the execution of an application or computer program). Application data may include data that is operated on (e.g., created, read, updated, deleted, organized, appended, etc.) by an application. An application may refer to any type of program, code, executable, instructions, etc. During application execution, application data may be created and saved to storage. Example applications include database applications, word processing applications, spreadsheet applications, cloud computing applications, data center applications, etc. Thus, application data may include any data that is generated by, derived from, or associated with an application. For example, for a database application, the application data may include the data that is stored, updated, etc. Examples of application data may include user preferences (e.g., persistent application data), user profile data, application interaction data, user input data, user configuration, etc. Additionally, or alternatively, application data may include system resource data, reference content, session state data, application settings, application logs, user shortcuts, library cache, application metadata, etc. Additionally, or alternatively, application data may include text data, documents, financial data, application files, user files, audio data, image data, video data, etc.

FIG. 1 illustrates an example system in accordance with one or more implementations as described herein. In FIG. 1, machine 105, which may also be termed a host, a system, or a server, is shown. While FIG. 1 depicts machine 105 as a tower computer, embodiments of the disclosure may extend to any form factor or type of machine. For example, machine 105 may be a rack server, a blade server, a desktop computer, a tower computer, a mini tower computer, a desktop server, a laptop computer, a notebook computer, a tablet computer, etc.

Machine 105 may include processor 110, memory 115, and storage device 120. Processor 110 may be any variety of processor. It is noted that processor 110, along with the other components discussed below, are shown outside the machine for case of illustration: embodiments of the disclosure may include these components within the machine. While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), Phase Change Memory (PCM), or Resistive Random-Access Memory (ReRAM). Memory 115 may be a volatile or non-volatile memory, as desired. Memory 115 may use any desired form factor: for example, Single In-Line Memory Module (SIMM), Dual In-Line Memory Module (DIMM), Non-Volatile DIMM (NVDIMM), etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115 or storage device 120. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe) protocol, a Serial Attached Small Computer System Interface (SCSI) (SAS) protocol, or a Serial AT Attachment (SATA) protocol. Storage device 120 may also include any desired interface, including, for example, a Peripheral Component Interconnect Express (PCIe) interface, or a Compute Express Link (CXL) interface. Storage device 120 may also take any desired form factor, including, for example, a U.2 form factor, a U.3 form factor, a M.2 form factor, Enterprise and Data Center Standard Form Factor (EDSFF) (including all of its varieties, such as E1 short, E1 long, and the E3 varieties), or an Add-In Card (AIC).

While FIG. 1 uses the term "storage device", embodiments of the disclosure may include any storage device formats that may benefit from the use of computational storage units, examples of which may include hard disk drives, Solid State Drives (SSDs), or persistent memory devices, such as PCM, ReRAM, or MRAM. Any reference to "storage device" "SSD" below should be understood to include such other embodiments of the disclosure and other varieties of storage devices. In some cases, the term "storage unit" may encompass storage device 120 and memory 115.

Machine 105 may also include power supply 135. Power supply 135 may provide power to machine 105 and its components. Machine 105 may also include transmitter 145 and receiver 150. Transmitter 145 or receiver 150 may be respectively used to transmit or receive data (e.g., offload data, offload code execution, application transfer). In some cases, transmitter 145 and/or receiver 150 may be used to communicate with memory 115 and/or storage device 120. Transmitter 145 may include write circuit 155, which may be used to write data into storage, such as a register, in memory 115 and/or storage device 120. In a similar manner, receiver 150 may include read circuit 160, which may be used to read data from storage, such as a register, in memory 115 and/or storage device 120

In the illustrated example, machine 105 may include accelerator 165. The accelerator 165 may include a hardware accelerator, a processor accelerator, and/or a co-processor. In one or more examples, accelerator 165 may include one or more accelerators that are part of an internal structure of machine 105. Additionally, or alternatively, accelerator 165 may include one or more accelerators external to machine 105 (e.g., communicatively connected to machine 105 via a network interface of machine 105). Accelerator 165 may be configured to perform one or more tasks more efficiently than a general-purpose processor (e.g., processor 110). This allows the general-purpose processor (e.g., processor 110) to run more efficiently by reducing its computational load. Accelerator 165 may be based on a custom logic design (e.g., field programmable gate array (FPGA), application specific integrated circuit (ASIC), etc.).

The machine 105 may be implemented with any type of apparatus that may be configured as a host including, for example, a server such as a compute server, a storage server, storage node, a network server, and/or the like, a computer such as a workstation, a personal computer, a tablet, a smartphone, and/or the like, or any combination thereof. The device may be implemented with any type of apparatus that may be configured as a device including, for example, an accelerator device, a storage device, a network device, a memory expansion and/or buffer device, CPU, a graphics processing unit (GPU), a neural processing unit (NPU), a tensor processing unit (TPU), and/or the like, or any combination thereof.

Any communication between devices (e.g., host, CS device, and/or any intermediary device) can occur over an interface that may be implemented with any type of wired and/or wireless communication medium, interface, protocol, and/or the like including PCIe, NVMe, Ethernet, NVMe-oF, Compute Express Link (CXL), and/or a coherent protocol such as CXL.mem, CXL.cache, CXL.IO and/or the like, Gen-Z, Open Coherent Accelerator Processor Interface (OpenCAPI), Cache Coherent Interconnect for Accelerators (CCIX), Advanced extensible Interface (AXI) and/or the like, or any combination thereof, Transmission Control Protocol/Internet Protocol (TCP/IP), FibreChannel, Infini-Band, Serial AT Attachment (SATA), Small Computer Systems Interface (SCSI), Serial Attached SCSI (SAS), iWARP, any generation of wireless network including 2G, 3G, 4G, 5G, and/or the like, any generation of Wi-Fi, Bluetooth, near-field communication (NFC), and/or the like, or any combination thereof. In some embodiments, the communication interfaces may include a communication fabric including one or more links, buses, switches, hubs, nodes, routers, translators, repeaters, and/or the like. In some embodiments, the system illustrated herein may include one or more additional apparatus having one or more additional communication interfaces.

Machine 105 may also include offload logic 140. Any of the functionality described herein, including any of the host functionality, device functionally, the offload logic 140 functionality, and/or the like, may be implemented with hardware, software, firmware, or any combination thereof including, for example, hardware and/or software combinational logic, sequential logic, timers, counters, registers, state machines, volatile memories such as dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), FPGAS, ASICs, CPUs including complex instruction set computer (CISC) processors such as x86 processors and/or reduced instruction set computer (RISC) processors such as RISC-V and/or ARM processors), graphics processing units (GPUs), neural processing units (NPUs), tensor processing units (TPUs) and/or the like, executing instructions stored in any type of memory. In some embodiments, one or more components may be implemented as a system-on-chip (SOC).

In some examples, the offload logic 140 may include any combination of logic (e.g., logical circuit), hardware (e.g., processing unit, memory, storage), software, firmware, and the like. In some cases, the offload logic 140 may perform one or more functions in conjunction with processor 110. In some cases, at least a portion of offload logic 140 may be implemented in processor 110 and/or memory 115. The offload logic 140 may be configured for transferring computational tasks. In some cases, the offload logic 140 may detect a trigger to offload instruction code from a first host (e.g., processor 110) to a second host (e.g., accelerator 165). The offload logic 140 may identify, based on the trigger, an address translation binding for the instruction code and an address translation binding for application data associated with the instruction code. The offload logic 140 may copy the address translation binding for the instruction code and the address translation binding for the application data to a memory. The offload logic 140 may transfer control of execution of the instruction code to the second host based on the copying.

Figure 2:
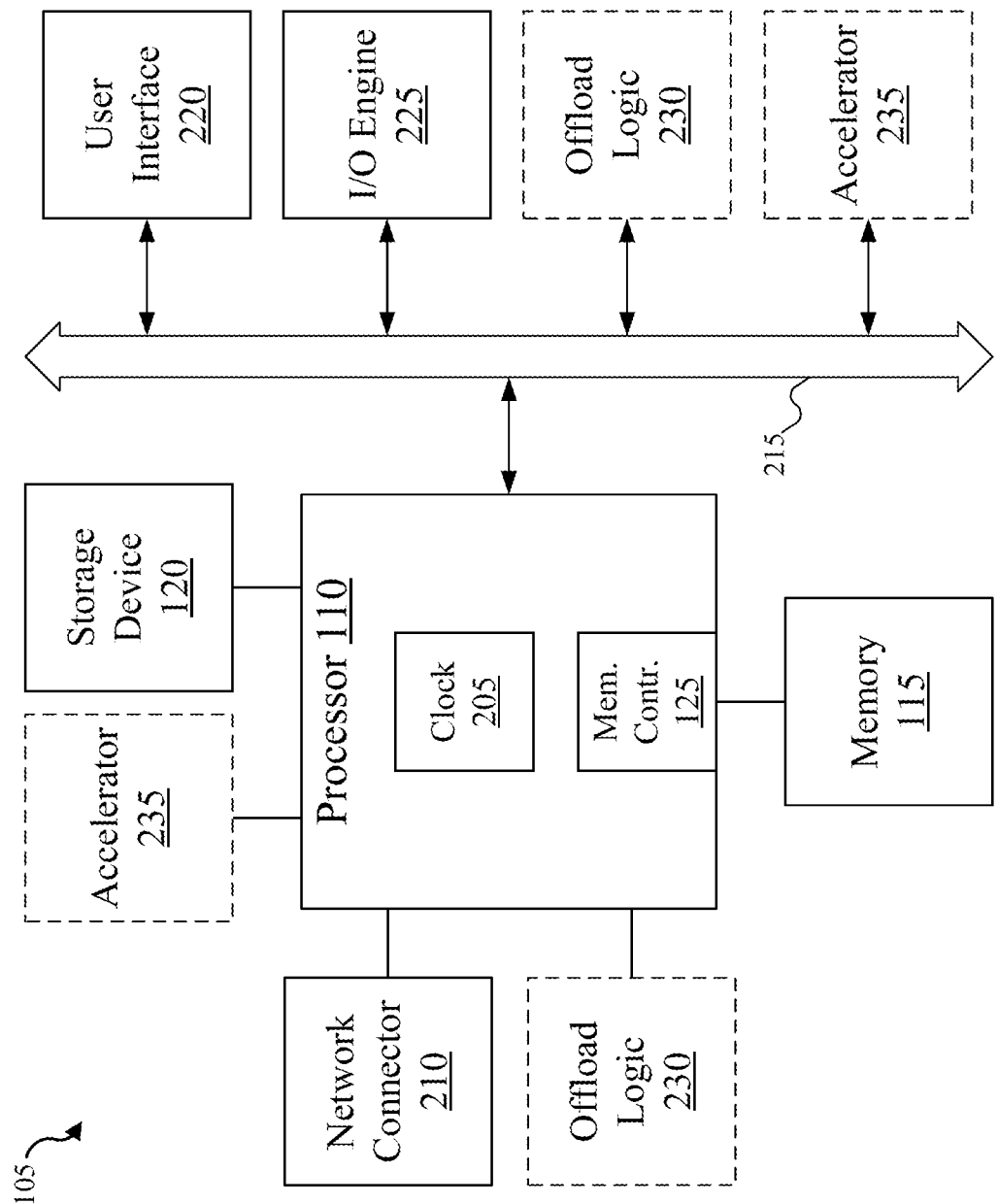
FIG. 2 illustrates details of the system of FIG. 1, according to one or more implementations as described herein.

FIG. 2 illustrates details of machine 105 of FIG. 1, according to examples described herein. In FIG. 2, typically, machine 105 includes one or more processors 110, which may include memory controllers 125 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

As shown, processors 110 may be coupled to offload logic 230, which may be an example of the offload logic 140 of FIG. 1. Additionally, or alternatively, processors 110 may be connected to buses 215, to which may be attached to offload logic 230. The offload logic 230 may be configured for transferring computational tasks based on the techniques described herein. For example, the offload logic 230 may transfer a computational task from processor 110 to accelerator 165.

As shown, processors 110 may be coupled to accelerator 235, which may be an example of the accelerator 165 of FIG. 1. Additionally, or alternatively, processors 110 may be connected to buses 215, to which may be attached to accelerator 235. The accelerator 235 may be configured for transferring computational tasks based on the techniques described herein. For example, the accelerator 235 may receive a computational task from processor 110.

Figure 3:
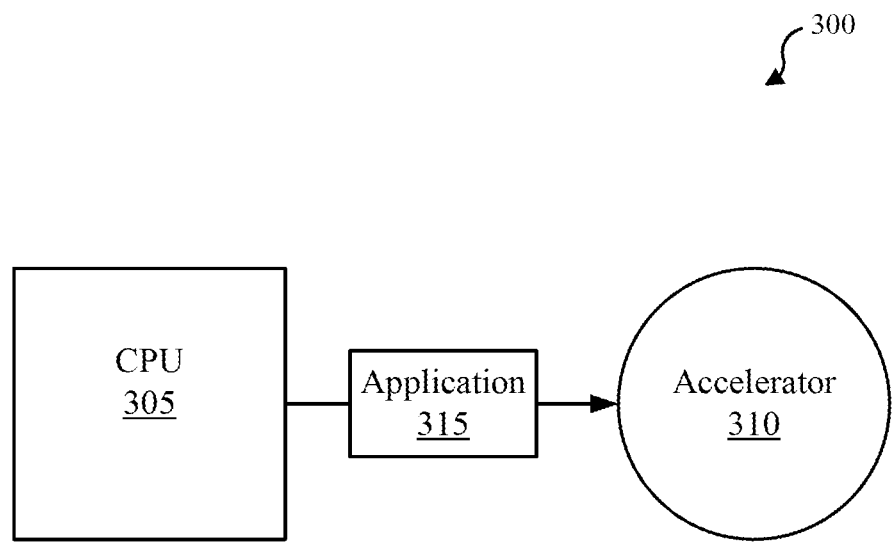
FIG. 3 illustrates an example system in accordance with one or more implementations as described herein.

FIG. 3 illustrates an example system 300 in accordance with one or more implementations as described herein. In one or more examples, system 300 illustrates an example system for an application execution transfer (e.g., offload processing). As shown, system 300 includes CPU 305 and accelerator 310. System 300 is an example system associated with an offload process from one component to another component (e.g., transfer application 315 from CPU 305 to accelerator 310). Based on the type of accelerator and the programming libraries used by an application, multiple back-and-forth data transfers and/or message communications may occur during an application's execution (e.g., until completion of the application transfer).

When execution of application 315 is transferred from CPU 305 to accelerator 310, the accelerator 310 may initiate execution of application 315 by reading a pre-set memory location associated with application 315. In some cases, the starting address is in the virtual address space. When the starting address is in the virtual address space, the accelerator 310 has to translate the starting address from virtual memory to physical memory before the accelerator 310 can access the memory location. However, translating the starting address to the physical memory address space can result in a page fault. The page fault may result in the accelerator 310 performing a page walk, which causes delay and a performance penalty on system 300.

The techniques described herein avoid the page fault by providing address translation bindings as part of the application execution transfer process. The described techniques accelerate the transfer/offload process of moving an application execution from one computing resource to another. Thus, the described techniques improve the transfer (e.g., offload) of an application execution from one computing resource to another computing resource (e.g., accelerator).

Figure 4:
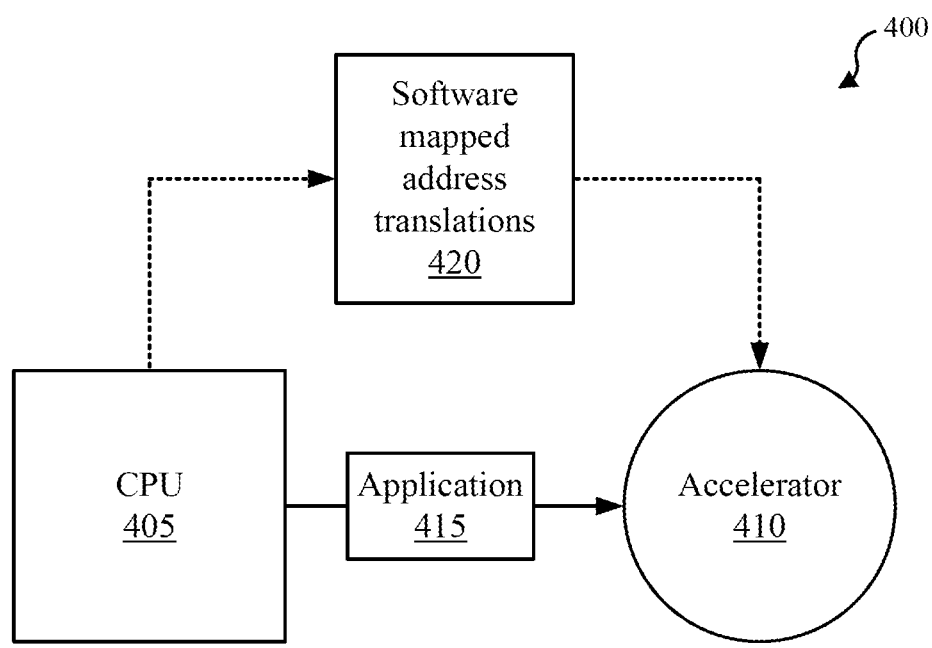
FIG. 4 illustrates an example system in accordance with one or more implementations as described herein.

FIG. 4 illustrates an example system 400 in accordance with one or more implementations as described herein. In one or more examples, system 400 illustrates an example system for an application execution transfer (e.g., offload processing). As shown, system 400 includes CPU 405 and accelerator 410. System 400 illustrates one example of an offload process that improves the performance of offload initialization. As shown, the improved offload process of system 400 provides an offload mechanism with mapping for address translations.

During an application execution on system 400, when a runtime (e.g., code of a programming model or operating system executing on a processor of system 400 such as CPU 405) identifies instruction code of an application (e.g., application code) to be transferred to another computing element (e.g., accelerator 410), the runtime triggers an offload operation from CPU 405 to accelerator 410. Some programming models include an offload process.

In the offload process, the execution of the instruction code is transferred via CPU 405 copying data into memory accessible by accelerator 410 and specifying the starting location (e.g., memory address) of the instruction code of application 415 to be run on the accelerator 410. The accelerator 410 then begins execution by fetching the instructions located at the starting memory address. The starting address specified may be from the user program space (e.g., a virtual address), thus, the virtual address is first translated to a physical address. In some cases, the virtual-to-physical address translation is handled by a translation lookaside buffer (TLB, e.g., of accelerator 410). However, in a conventional system, the TLB is unlikely to have this specific virtual-to-physical address translation binding, thus, the virtual-to-physical address translation triggers a page fault and a page walk is initiated to retrieve the address translation bindings. Such page walks can slow down execution of an application relative to offloading the application. Thus, page walks affect performance adversely and are a limiting factor in offloading applications (e.g., application code, kernels, relatively small kernels) to accelerators.

In one or more examples, the CPU 405 and/or the accelerator 410 may include offload logic (e.g., offload logic 140, offload logic 230) configured to improve the offload processing (e.g., by minimizing page faults at the start of an offload application execution transfer). In some cases, the offload logic operates in conjunction with a programming model or operating system of system 400. Accordingly, system 400 provides offload logic to accelerate initiation of the execution on the accelerator 410 by providing software mapped address translations 420 (e.g., address translation bindings) as part of the application transfer process.

In some cases, CPU 405 may detect a trigger to offload instruction code of application 415 from CPU 405 to accelerator 410. Based on the trigger, CPU 405 may identify software mapped address translations 420 associated with application 415. For example, CPU 405 may identify address translation bindings for the instruction code of application 415 and address translation bindings for application data associated with application 415. The CPU 405 may copy the software mapped address translations 420 (e.g., copy the instruction code address translation bindings and application data address translation bindings) to a memory. CPU 405 may transfer control of execution of the instruction code of application 415 to accelerator 410 based on the copying.

Figure 5:
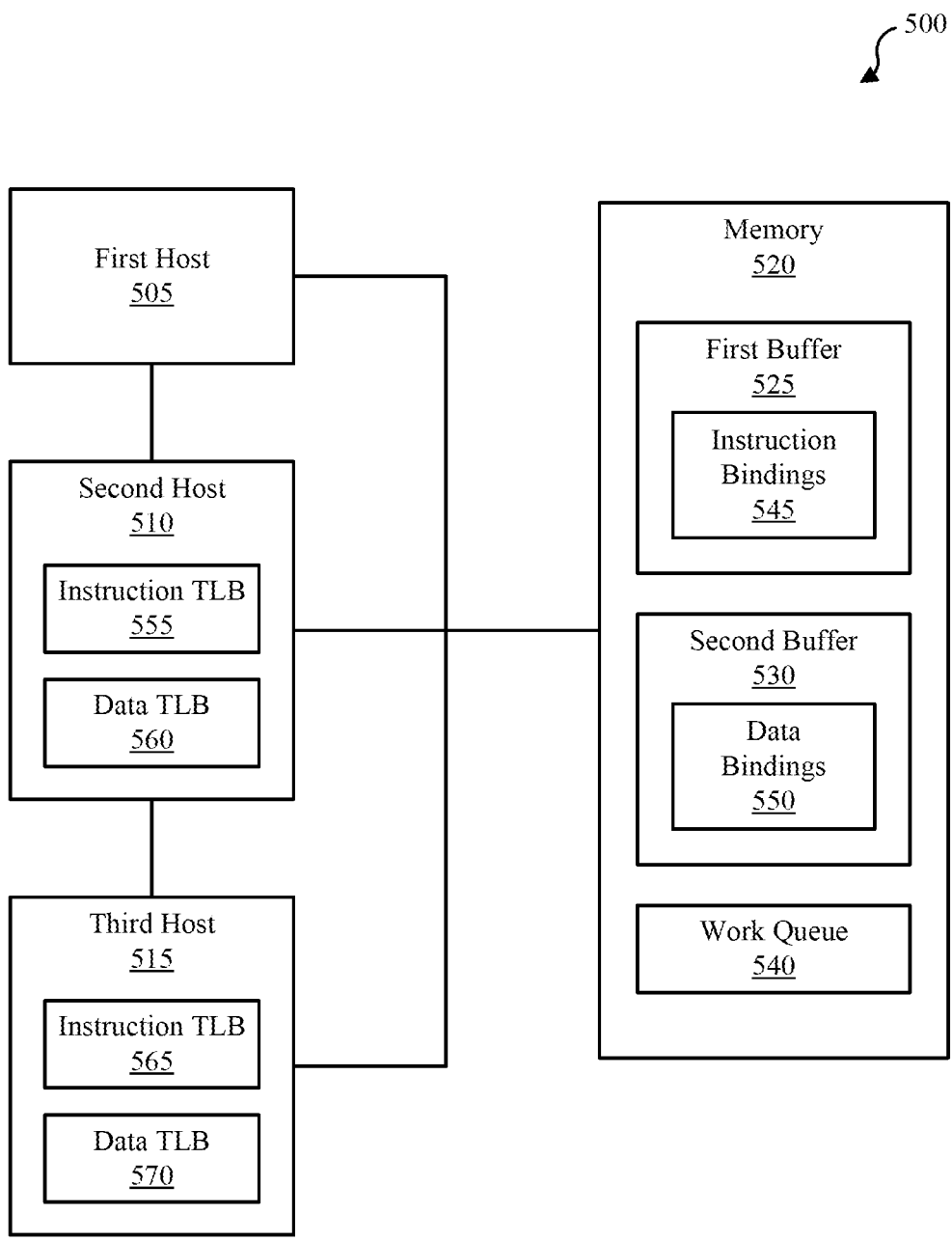
FIG. 5 illustrates an example system in accordance with one or more implementations as described herein.

FIG. 5 illustrates an example system 500 in accordance with one or more implementations as described herein. In one or more examples, system 500 illustrates an example system for an application execution transfer (e.g., offload processing). In the illustrated example, system 400 includes first host 505, second host 510, third host 515, and memory 520. First host 505 may be an example of processor 110 of FIGS. 1 and 2, machine 105 of FIGS. 1 and 2, and/or CPU 405 of FIG. 4. Second host 510 may be an example of accelerator 165 of FIG. 1, accelerator 235 of FIG. 2, and/or accelerator 410 of FIG. 4. System 500 illustrates one example of an offload process that improves the performance of offload initialization. In some examples, first host 505 is a main processing unit of a compute node (e.g., processor 110 of machine 105, CPU 405 of FIG. 4), second host 510 is a first accelerator (e.g., accelerator 165 of FIG. 1, accelerator 235 of FIG. 2, accelerator 410 of FIG. 4), and third host 515 is a second accelerator (e.g., accelerator 165 of FIG. 1, accelerator 235 of FIG. 2, accelerator 410 of FIG. 4).

As shown, memory 520 includes first buffer 525 associated with instruction code, second buffer 530 associated with application data, and work queue 540 (e.g., offload work queue). In the illustrated example, second host 510 includes instruction translation lookaside buffers (TLB) 555 and data TLB 560. Third host 515 includes instruction TLB 565 and data TLB 570.

In one or more examples, first host 505, second host 510, and/or third host 515 may include offload logic (e.g., offload logic 140, offload logic 230) configured to improve the offload processing (e.g., by minimizing page faults at the start of an offload application execution transfer). Before application execution, the offload logic (e.g., of first host 505, second host 510, and/or third host 515) may be configured to define first buffer 525 and second buffer 530 of memory 520. The offload logic configures first buffer 525 to hold address translations for instruction code (e.g., instruction code of application 415). The first buffer 525 may be referred to as OFFLOAD_BINDINGS_I (e.g., programmatically referred to as OFFLOAD_BINDINGS_I). The offload logic configures second buffer 530 to hold application data (e.g., application data of application 415). The second buffer 530 may be referred to as OFFLOAD_BINDINGS_D (e.g., programmatically referred to as OFFLOAD_BINDINGS_D).

In one or more examples, the offload logic configures the size of the first buffer 525 based on a size of instruction TLB 555 of second host 510 and/or a size of instruction TLB 565 of third host 515. Instruction TLB 555 and/or instruction TLB 565 may be associated with buffering or storing instruction code segments. In some examples, the offload logic may configure the size of the first buffer 525 based on a multiple of the size of instruction TLB 555 and/or instruction TLB 565 (e.g., first buffer 525 configured as 1× the size, 2× the size, or a fraction of the size of instruction TLB 555 and/or instruction TLB 565). For example, the offload logic may configure the size of the first buffer 525 to match the size of instruction TLB 555 and/or instruction TLB 565.

Additionally, or alternatively, the offload logic configures the size of the second buffer 530 based on a size of data TLB 560 of second host 510 and/or data TLB 570 of third host 515. In some cases, data TLB 560 and/or data TLB 570 may be associated with buffering or storing data code segments. In one or more examples, the offload logic may configure the size of the second buffer 530 based on a multiple of the size of data TLB 560 and/or data TLB 570 (e.g., second buffer 530 configured as 1× the size, 2× the size, or a fraction of the size of data TLB 560 and/or data TLB 570). For example, the offload logic may configure the size of the second buffer 530 to match a size of data TLB 560 and/or data TLB 570.

In one or more examples, at least a portion of memory 520 includes a global address space that is accessible by first host 505, second host 510, and/or third host 515. In some examples, the offload logic places the buffers in a global address space of memory 520 that is accessible by first host 505, second host 510, and/or third host 515. When the offload logic detects an offload code (e.g., an application to offload), the offload logic records the starting memory address location for the application to be run on an accelerator (e.g., detected by first host 505 and transferred from first host 505 to second host 510 and/or third host 515).

The offload logic is configured to identify the address translation bindings for the instruction code designated to be offloaded from first host 505 and run on second host 510 and/or third host 515. Accordingly, the offload logic identifies instruction bindings 545 (e.g., address translations bindings for instruction code associated with an application being transferred) and copies instruction bindings 545 to first buffer 525. As indicated, the maximum translations that can be copied to the first buffer 525 is dictated by the size of instruction TLB 555 and/or instruction TLB 565. Additionally, or alternatively, the offload logic identifies data bindings 550 (e.g., address translations bindings for application data associated with an application being transferred) and copies data bindings 550 to second buffer 530. As indicated, the maximum translations that can be copied to the second buffer 530 is dictated by size of data TLB 560 and/or data TLB 570.

Before execution of offloaded instruction code begins on second host 510 and/or third host 515 (e.g., on one or more accelerators), the offload logic (e.g., of first host 505) issues instructions to second host 510 and/or third host 515 to copy instruction bindings 545 from first buffer 525 to instruction TLB 555 and/or instruction TLB 565. Similarly, the offload logic (e.g., of first host 505) issues instructions to second host 510 and/or third host 515 to copy data bindings 550 from second buffer 530 to data TLB 560 and/or data TLB 570.

When second host 510 and/or third host 515 include multiple execution elements that access memory 520 (e.g., minions), then the offload logic copies instruction and data address translation bindings to the respective execution elements (e.g., to each of the execution elements). In some cases, third host 515 is a minion of second host 510. Additionally, or alternatively, each execution element of second host 510 and/or third host 515 may be configured to perform a read operation in the global address space of memory 520, read the contents of first buffer 525 (e.g., instruction bindings 545), read the contents of second buffer 530 (e.g., data bindings 550), and populate their respective instruction TLBs and data TLBs accordingly.

In one or more examples, the offload logic (e.g., of first host 505) may indicate the offloading of the instruction code in work queue 540. In some cases, the offload logic (e.g., of second host 510 and/or third host 515) may be configured to identify an offloading of the instruction code based on work queue 540 that is accessible to second host 510 and third host 515. In some cases, work queue 540 is in the global address space of memory 520. Second host 510 and/or third host 515 may monitor work queue 540 for offload instructions from first host 505. In some cases, first host 505 may detect a trigger to offload instruction code (e.g., in conjunction with an operating system and/or offload logic of first host 505). First host 505 may copy instruction bindings 545 to first buffer 525 and data bindings 550 to second buffer 530 based on the trigger to offload the instruction code. In some examples, first host 505 may update work queue 540 with instructions for a next available accelerator (e.g., second host 510 and/or third host 515) to execute the indicated instruction code and copy the address translation bindings to respective instruction TLBs and data TLBs.

Once each of the address translation bindings are copied over to respective TLBs, the offload logic (e.g., in conjunction with an operating system of first host 505) may transfer control of execution to the accelerator execution elements and program execution continues on the accelerator. For example, once the offload logic determines the bindings are transferred, the offload logic transfers control of execution of the instruction code to the respective accelerators (e.g., second host 510 and/or third host 515)

In one or more examples, the offload logic (e.g., of first host 505) may be configured to detect a trigger to offload instruction code from first host 505 to second host and/or third host 515. The offload logic may identify, based on the trigger, an address translation binding for the instruction code (e.g., instruction bindings 545) and an address translation binding for application data (e.g., data bindings 550) associated with the instruction code. The offload logic may copy the address translation binding for the instruction code and the address translation binding for the application data to memory 520.

In some examples, first host 505 includes a CPU, an operating system associated the CPU, memory, and/or storage (e.g., SSD) of a first device. Additionally, or alternatively, second host 510 is a first accelerator of the first device or a first accelerator of a second device different from the first device. Additionally, or alternatively, third host 515 is a second accelerator of the first device, a second accelerator of the second device, or a second accelerator of a third device different from the first device and the second device.

The offload logic (e.g., of second host 510 and/or third host 515) may be configured to receive (e.g., from first host 505) control of execution of the instruction code based on the copying of the address translation bindings to respective TLBs. The offload logic (e.g., of second host 510 and/or third host 515) may then execute the instruction code based on receiving the control of the execution. In some examples, the offload logic of second host 510 may be configured to share the address translation binding for the instruction code (e.g., instruction bindings 545) and the address translation binding for the application data (e.g., data bindings 550) with third host 515 (e.g., based on a configuration of second host 510 and/or instructions from first host 505). In some examples, the address translation binding for the instruction code (e.g., instruction bindings 545) enables the second host 510 and/or third host 515 to determine a starting address of the instruction code. Additionally, or alternatively, the address translation binding for the application data (e.g., data bindings 550) enables second host 510 and/or third host 515 to determine a starting address of the application data.

Figure 6:
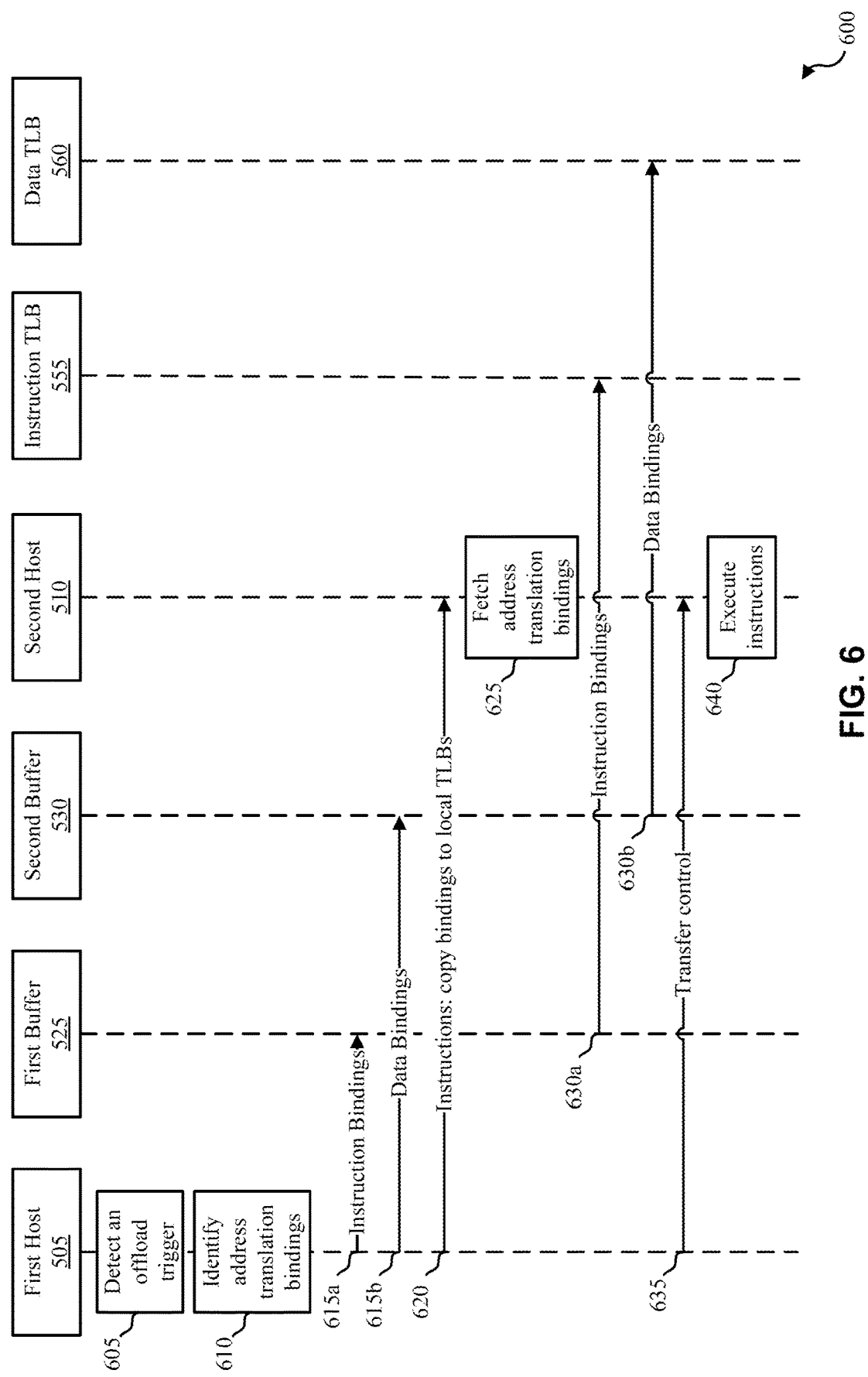
FIG. 6 depicts a flow diagram illustrating an example method associated with the disclosed systems, in accordance with example implementations described herein.

FIG. 6 depicts a flow diagram illustrating an example method 600 associated with the disclosed systems, in accordance with example implementations described herein. In some configurations, the method 600 may be implemented by the offload logic 140 of FIG. 1, the accelerator 165 of FIG. 1, the offload logic 230 of FIG. 2, the accelerator 235 of FIG. 2, one or more components of the system 400 of FIG. 4, and/or one or more components of the system 500 of FIG. 5. In some configurations, the method 600 may be implemented in conjunction with machine 105, components of machine 105, or any combination thereof. The method 600 is just one implementation and one or more operations of the method 600 may be rearranged, reordered, omitted, and/or otherwise modified such that other implementations are possible and contemplated.

At 605, the first host 505 detects an offload trigger (e.g., to transfer an application from the first host 505 to the second host 510). For example, the trigger may be based on at least one of energy consumption of the task on the first host 505 versus on the second host 510, latency of the task on the on the first host 505 versus on the second host 510, a quality of service of the task on the on the first host 505 versus on the second host 510, and/or availability of resources on the on the first host 505 versus on the second host 510.

At 610, the first host 505 identifies address translation bindings for the application being transferred from the first host 505 to the second host 510 based on the trigger. The address translation bindings may include instruction address translation bindings and data address translation bindings.

At 615*a*, the first host 505 transfers the instruction address translation bindings to the first buffer 525. At 615*b*, the first host 505 transfers the data address translation bindings to the second buffer 530.

At 620, the first host 505 instructs the second host 510 to copy the address translation bindings to the respective TLBs of the second host 510.

At 625, the second host 510 fetches the address translation bindings based on the instruction from the first host 505.

At 630*a*, the second host 510 copies the instruction address translation bindings from the first buffer 525 to the instruction TLB 555. At 630*b*, the second host 510 copies the data address translation bindings from the second buffer 530 to the data TLB 560.

At 635, the first host 505 transfers control of the execution of the application being transferred to the second host 510.

At 640, the second host 510 executes the instruction code of the transferred application based on the control of the execution of the application being transferred to the second host 510.

Figure 7:
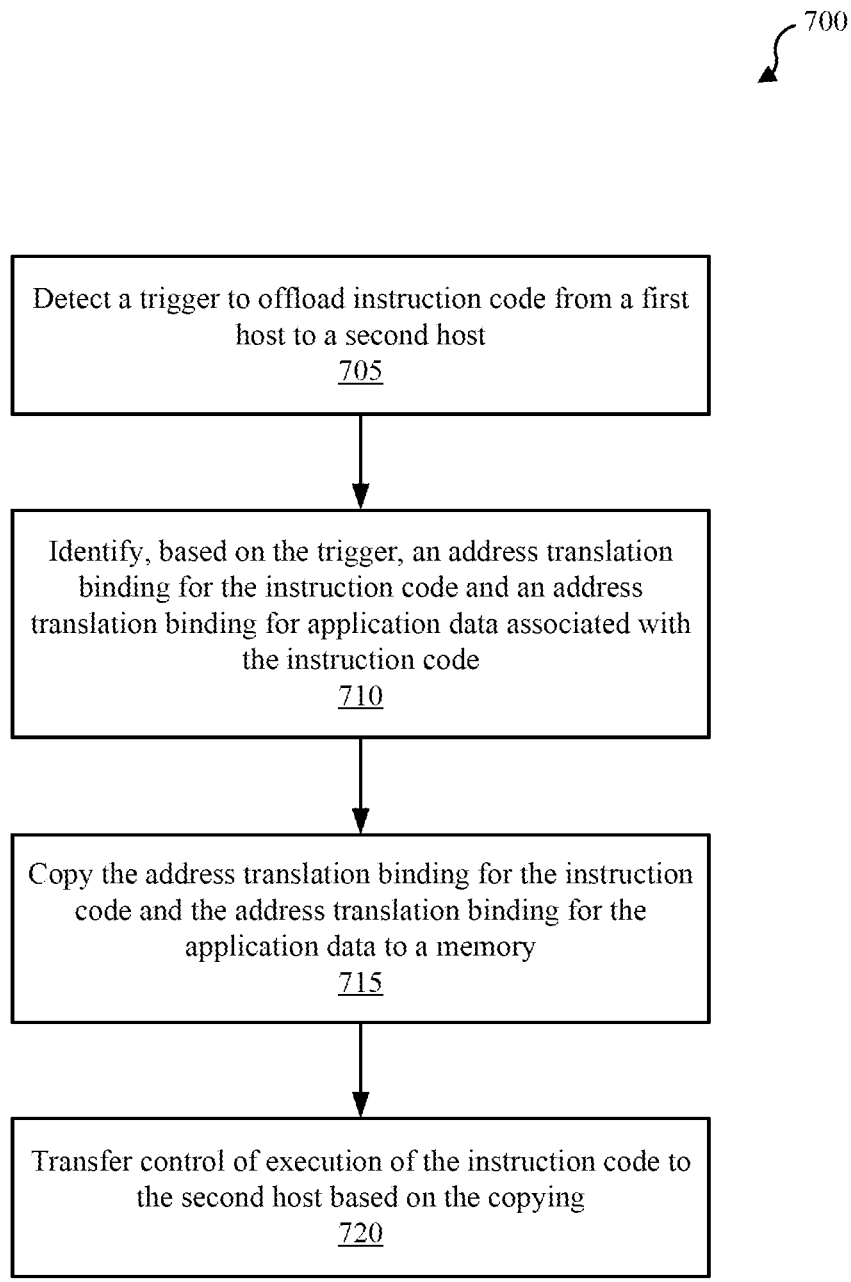
FIG. 7 depicts a flow diagram illustrating an example method associated with the disclosed systems, in accordance with example implementations described herein.

FIG. 7 depicts a flow diagram illustrating an example method 700 associated with the disclosed systems, in accordance with example implementations described herein. In some configurations, the method 700 may be implemented by the offload logic 140 of FIG. 1, the accelerator 165 of FIG. 1, the offload logic 230 of FIG. 2, the accelerator 235 of FIG. 2, one or more components of the system 400 of FIG. 4, and/or one or more components of the system 500 of FIG. 5. In some configurations, the method 700 may be implemented in conjunction with machine 105, components of machine 105, or any combination thereof. The method 700 is just one implementation and one or more operations of the method 700 may be rearranged, reordered, omitted, and/or otherwise modified such that other implementations are possible and contemplated.

At 705, the method 700 may include detecting a trigger to offload instruction code from a first host to a second host. For example, the first host 505 may detect a trigger to offload execution of an application from the first host 505 to the second host 510 and/or the third host 515.

At 710, the method 700 may include identifying, based on the trigger, an address translation binding for the instruction code and an address translation binding for application data associated with the instruction code. For example, based on the trigger, the first host 505 may identify address translation bindings for the instruction code and address translation bindings for application data associated with the instruction code.

At 715, the method 700 may include copying the address translation binding for the instruction code and the address translation binding for the application data to a memory. For example, the first host 505 may copy the address translation bindings for the instruction code and the address translation bindings for the application data to memory 520.

At 720, the method 700 may include transferring control of execution of the instruction code to the second host based on the copying. For example, the first host 505 may transfer control of execution of the instruction code to the second host 510 based on the first host 505 determining that the second host 510 has copied the instruction code address translation bindings and the application data address translation bindings from memory 520 to respective TLBs of the second host 510.

Figure 8:
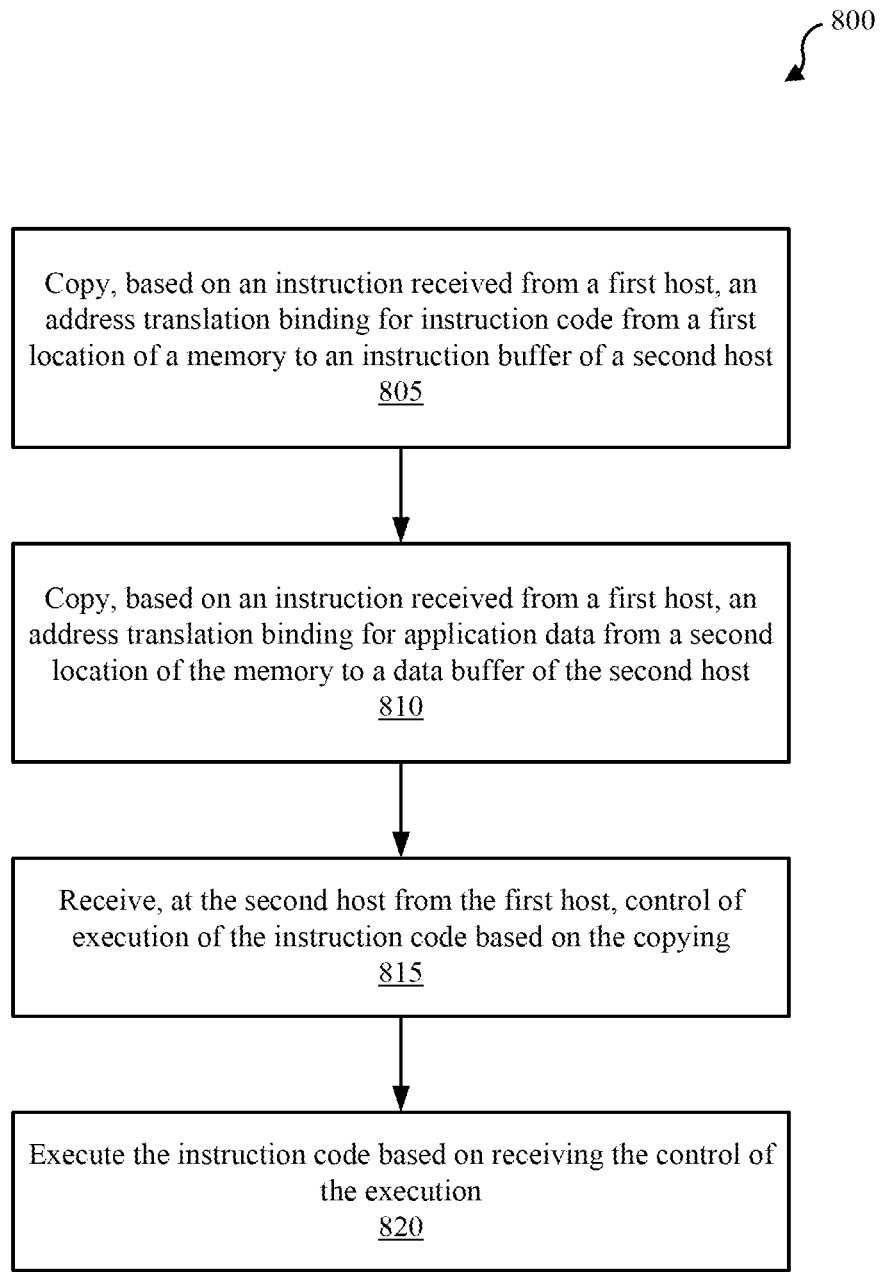
FIG. 8 depicts a flow diagram illustrating an example method associated with the disclosed systems, in accordance with example implementations described herein.

FIG. 8 depicts a flow diagram illustrating an example method 800 associated with the disclosed systems, in accordance with example implementations described herein. In some configurations, the method 800 may be implemented by the offload logic 140 of FIG. 1, the accelerator 165 of FIG. 1, the offload logic 230 of FIG. 2, the accelerator 235 of FIG. 2, one or more components of the system 400 of FIG. 4, and/or one or more components of the system 500 of FIG. 5. In some configurations, the method 800 may be implemented in conjunction with machine 105, components of machine 105, or any combination thereof. The method 800 is just one implementation and one or more operations of the method 800 may be rearranged, reordered, omitted, and/or otherwise modified such that other implementations are possible and contemplated.

At 805, based on an instruction received from a first host, the method 800 may include copying an address translation binding for instruction code from a first location of a memory to an instruction buffer of a second host, and an address translation binding for application data from a second location of the memory to a data buffer of the second host. For example, based on an instruction from the first host 505, the second host 510 may copy the instruction code address translation bindings from memory 520 to instruction TLB 555, and copy the application data address translation bindings from memory 520 to data TLB 560.

At 810, the method 800 may include receiving, at the second host from the first host, control of execution of the instruction code based on the copying. For example, the second host 510 may receive, from the first host 505, control of execution of the instruction code based on the second host 510 copying the address translation bindings for the instruction code and the address translation bindings for the application data from memory 520 to the respective TLBs of the second host 510.

At 815, the method 800 may include executing the instruction code based on receiving the control of the execution. For example, the second host 510 may use the instruction code address translation bindings copied to instruction TLB 555 and the application data address translation bindings for copied to data TLB 560 to execute the instruction code of the transferred application.

Figure 9:
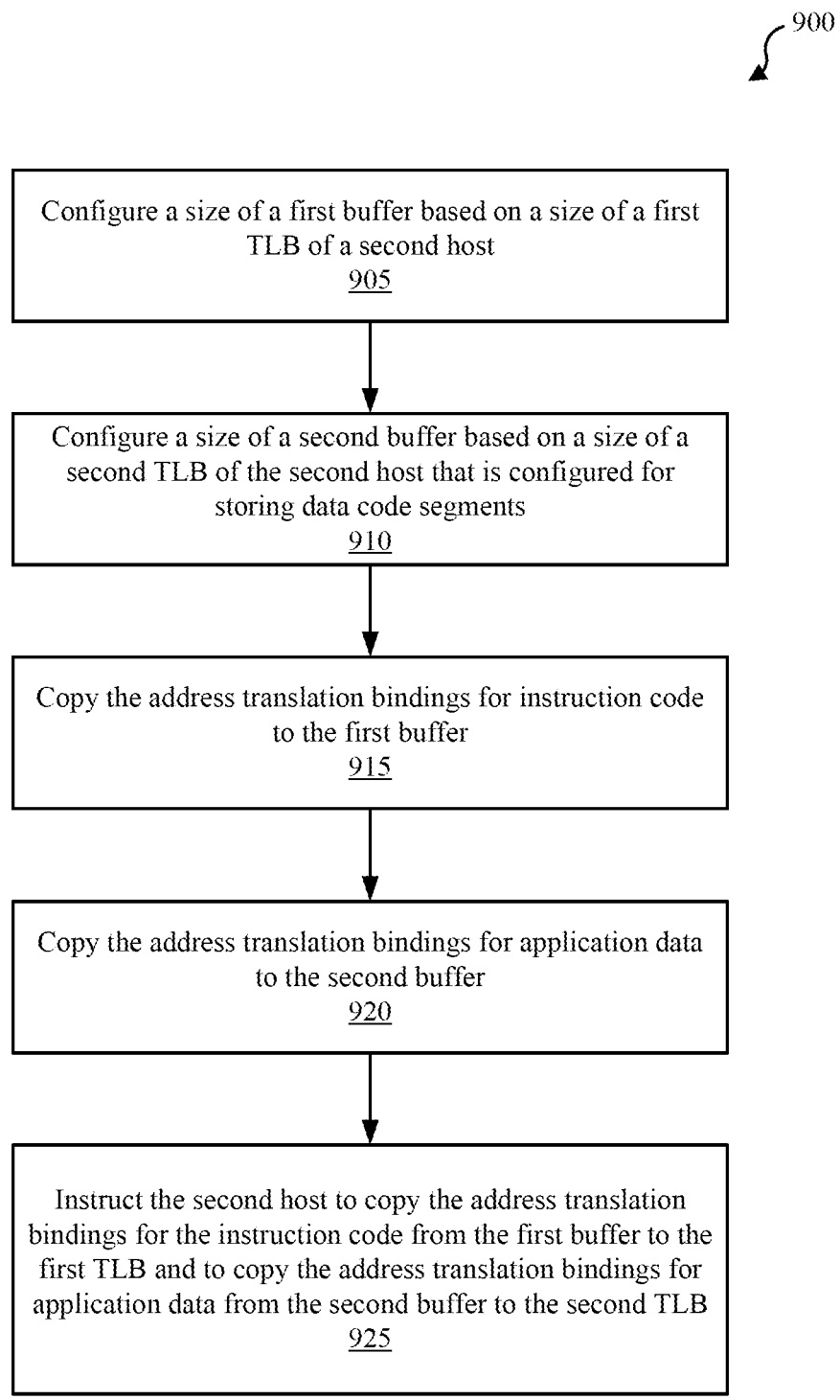
FIG. 9 depicts a flow diagram illustrating an example method associated with the disclosed systems, in accordance with example implementations described herein.

FIG. 9 depicts a flow diagram illustrating an example method 900 associated with the disclosed systems, in accordance with example implementations described herein. In some configurations, the method 900 may be implemented by the offload logic 140 of FIG. 1, the accelerator 165 of FIG. 1, the offload logic 230 of FIG. 2, the accelerator 235 of FIG. 2, one or more components of the system 400 of FIG. 4, and/or one or more components of the system 500 of FIG. 5. In some configurations, the method 900 may be implemented in conjunction with machine 105, components of machine 105, or any combination thereof. The method 900 is just one implementation and one or more operations of the method 900 may be rearranged, reordered, omitted, and/or otherwise modified such that other implementations are possible and contemplated.

At 905, the method 900 may include configuring a size of a first buffer based on a size of a first TLB of a second host, where the first TLB is configured for storing instruction code segments associated with the second host. For example, the first host 505 may configure a size of first buffer 525 based on a size of instruction TLB 555 of the second host 510.

At 910, the method 900 may include configuring a size of a second buffer based on a size of a second TLB of the second host, where the second TLB is configured for storing data code segments associated with the second host. For example, the first host 505 may configure a size of second buffer 530 based on a size of data TLB 560 of the second host 510.

At 915, the method 900 may include copying the address translation bindings for instruction code to the first buffer. For example, the first host 505 may copy address translation bindings for instruction code to the first buffer 525.

At 920, the method 900 may include copying the address translation bindings for application data to the second buffer. For example, the first host 505 may copy address translation bindings for application data to the second buffer 530.

At 925, the method 900 may include instructing the second host to copy the address translation bindings for the instruction code from the first buffer to the first TLB and to copy the address translation bindings for application data from the second buffer to the second TLB. For example, the first host 505 may instruct the second host 510 to copy the instruction code address translation bindings from the first buffer 525 to the instruction TLB 555 and to copy the application data address translation bindings from the second buffer 530 to the data TLB 560.

In the examples described herein, the configurations and operations are example configurations and operations, and may involve various additional configurations and operations not explicitly illustrated. In some examples, one or more aspects of the illustrated configurations and/or operations may be omitted. In some embodiments, one or more of the operations may be performed by components other than those illustrated herein. Additionally, or alternatively, the sequential and/or temporal order of the operations may be varied.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Arca Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other examples described herein set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A method for transferring computational tasks, the method comprising:
   detecting a trigger to offload instruction code from a first host to a second host;
   identifying, based on the trigger, an address translation binding for the instruction code and an address translation binding for application data associated with the instruction code;
   copying the address translation binding for the instruction code and the address translation binding for the application data to a memory; and
   transferring control of execution of the instruction code to the second host based on the copying.

2. The method of claim 1, wherein the memory includes:
   a first buffer configured to hold instruction code address translations; and
   a second buffer configured to hold application data address translations.

3. The method of claim 2, further comprising:
   configuring a size of the first buffer based on a size of a first translation lookaside buffer (TLB) of the second host that is configured for storing instruction code segments; and
   configuring a size of the second buffer based on a size of a second TLB of the second host that is configured for storing data code segments.

4. The method of claim 3, wherein transferring control of execution of the instruction code includes issuing an instruction to the second host to copy the address translation binding for the instruction code from the first buffer to the first TLB and copy the address translation binding for the application data from the second buffer to the second TLB.

5. The method of claim 1, further comprising providing the address translation binding for the instruction code and the address translation binding for the application data to a third host.

6. The method of claim 5, wherein the memory includes a global address space that is accessible to the first host, the second host, and the third host.

7. The method of claim 5, wherein transferring control of the execution of the instruction code to the second host includes transferring control of the execution of the instruction code to the second host and the third host.

8. The method of claim 5, further comprising indicating the offloading of the instruction code in an offload work queue that is accessible to the second host and the third host.

9. The method of claim 5, wherein:
   the first host is an operating system associated with a processing unit of a first device,
   the second host is a first accelerator of the first device or a second device different from the first device, and
   the third host is a second accelerator of the first device, the second device, or of a third device different from the first device and the second device.

10. A method for assuming computational tasks, the method comprising:
    based on an instruction received from a first host, copying:
       an address translation binding for instruction code from a first location of a memory to an instruction buffer of a second host; and
       an address translation binding for application data from a second location of the memory to a data buffer of the second host;
    receiving, at the second host from the first host, control of execution of the instruction code based on the copying; and
    executing the instruction code based on receiving the control of the execution.

11. The method of claim 10, wherein:
    the instruction buffer of the second host is a first translation lookaside buffer (TLB) of the second host that is configured for storing instruction code segments, and
    the data buffer of the second host is a second TLB of the second host that is configured for storing data code segments.

12. The method of claim 10, wherein:
    the first location of the memory is a first buffer configured to hold instruction code address translations; and
    the second location of the memory is a second buffer configured to hold application data address translations.

13. The method of claim 12, wherein:
    a size of the first buffer is based on a size of the instruction buffer of the second host; and
    a size of the second buffer is based on a size of the data buffer of the second host.

14. The method of claim 12, further comprising sharing the address translation binding for the instruction code and the address translation binding for the application data with a third host.

15. The method of claim 14, wherein the first buffer and the second buffer of the memory are configured in a global address space that is accessible to the first host, the second host, and the third host.

16. The method of claim 14, further comprising:
    identifying an offloading of the instruction code based on an offload work queue that is accessible to the second host and the third host.

17. The method of claim 10, wherein:
    the address translation binding for the instruction code enables the second host to determine a starting address of the instruction code, and the address translation binding for the application data enables the second host to determine a starting address of the application data.

18. A non-transitory computer-readable medium storing code, the code comprising instructions executable by a processor of a device to:
    detect a trigger to offload instruction code from a first host to a second host;
    identify, based on the trigger, an address translation binding for the instruction code and an address translation binding for application data associated with the instruction code;
    copy the address translation binding for the instruction code and the address translation binding for the application data to a memory; and
    transfer control of execution of the instruction code to the second host based on the copying.

19. The non-transitory computer-readable medium of claim 18, wherein the memory includes:
    a first buffer configured to hold instruction code address translations; and
    a second buffer configured to hold application data address translations.

20. The non-transitory computer-readable medium of claim 19, wherein the code includes further instructions executable by the processor to cause the device to:
    configure a size of the first buffer based on a size of a first translation lookaside buffer (TLB) of the second host that is configured for storing instruction code segments; and
    configure a size of the second buffer based on a size of a second TLB of the second host that is configured for storing data code segments.

* * * * *